(12) United States Patent
Jeyabalan

(10) Patent No.: US 10,260,611 B2
(45) Date of Patent: Apr. 16, 2019

(54) HYDROKINETIC TORQUE COUPLING DEVICE HAVING TURBINE-PISTON LOCKUP CLUTCH, AND RELATED METHODS

(71) Applicant: VALEO EMBRAYAGES, Amiens (FR)

(72) Inventor: Subramanian Jeyabalan, Troy, MI (US)

(73) Assignee: Valeo Embrayages, Amiens (FR)

( * ) Notice: Subject to any disclaimer, the term of this patent is extended or adjusted under 35 U.S.C. 154(b) by 77 days.

(21) Appl. No.: 15/476,361

(22) Filed: Mar. 31, 2017

(65) Prior Publication Data

US 2018/0283516 A1 Oct. 4, 2018

(51) Int. Cl.
| | |
|---|---|
| *F16H 45/02* | (2006.01) |
| *F16H 41/24* | (2006.01) |
| *F16H 41/28* | (2006.01) |

(52) U.S. Cl.
CPC ............. *F16H 45/02* (2013.01); *F16H 41/24* (2013.01); *F16H 41/28* (2013.01); *F16H 2045/0215* (2013.01); *F16H 2045/0221* (2013.01); *F16H 2045/0294* (2013.01)

(58) Field of Classification Search
USPC ...................................................... 192/3.29
See application file for complete search history.

(56) References Cited

U.S. PATENT DOCUMENTS

| | | | |
|---|---|---|---|
| 5,799,763 A | * | 9/1998 | Dehrmann ............... F16D 13/64 192/107 C |
| 7,191,879 B2 | | 3/2007 | Arhab et al. |
| 8,276,723 B2 | | 10/2012 | Verhoog et al. |
| 9,297,448 B1 | | 3/2016 | Depraete et al. |
| 9,341,250 B1 | | 5/2016 | Depraete et al. |
| 9,441,718 B2 | | 9/2016 | Depraete et al. |
| 9,528,586 B2 | | 12/2016 | Depraete et al. |
| 9,541,181 B2 | | 1/2017 | Depraete |
| 9,562,598 B2 | | 2/2017 | Depraete et al. |
| 9,574,649 B2 | | 2/2017 | Lee et al. |
| 9,593,755 B2 | | 3/2017 | Depraete et al. |
| 9,599,206 B2 | | 3/2017 | Depraete |
| 2015/0152951 A1 | * | 6/2015 | Rentfrow ................ F16H 45/02 192/3.29 |
| 2016/0102743 A1 | | 4/2016 | Depraete |

(Continued)

*Primary Examiner* — Mark A Manley
(74) *Attorney, Agent, or Firm* — Berenato & White, LLC

(57) ABSTRACT

A hydrokinetic torque coupling device includes a casing including a casing shell and an impeller shell, a piston engagement member non-rotatably coupled to the casing and having a first engagement surface, a turbine-piston including a turbine-piston shell partitioning an interior volume of the hydrokinetic torque coupling device into a torus chamber and a damper chamber and including a turbine-piston flange having a second engagement surface movable axially toward and away from the first engagement surface of the piston engagement member to position the hydrokinetic torque coupling device respectively into and out of a lockup mode, and a restricting washer disposed between the impeller shell and the turbine-piston shell for restricting a hydraulic fluid flow into and from the torus chamber for increasing a hydraulic fluid pressure in the torus chamber and pushing the turbine-piston shell toward the first engagement surface of the reaction plate.

20 Claims, 11 Drawing Sheets

(56) References Cited

U.S. PATENT DOCUMENTS

| | | |
|---|---|---|
| 2016/0102746 A1 | 4/2016 | Depraete et al. |
| 2016/0116038 A1 | 4/2016 | Depraete et al. |
| 2016/0116040 A1 | 4/2016 | Werthman et al. |
| 2016/0116041 A1 | 4/2016 | Depraete |
| 2016/0160971 A1 | 6/2016 | Depraete et al. |
| 2016/0160975 A1 | 6/2016 | Depraete et al. |
| 2017/0023117 A1 | 1/2017 | Depraete |

\* cited by examiner

HYDROKINETIC TORQUE COUPLING DEVICE HAVING TURBINE-PISTON LOCKUP CLUTCH, AND RELATED METHODS

BACKGROUND OF THE INVENTION

1. Field of the Invention

The present invention generally relates to hydrokinetic torque coupling devices, and more particularly to a hydrokinetic torque coupling device including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operation conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As disclosed hereinbelow, such improvements may derive, for example, from reducing the spatial requirements of components of the hydrokinetic torque coupling device and/or consolidating functions of two or more components into a single component.

BRIEF SUMMARY OF THE INVENTION

According to a first aspect of the invention, there is provided a hydrokinetic torque coupling device for coupling together a driving shaft and a driven shaft. The hydrokinetic torque coupling device of this first aspect includes a casing rotatable about a rotational axis and comprising a casing shell and an impeller shell disposed axially opposite to the casing shell, a piston engagement member non-rotatably coupled to the casing and including an annular reaction plate extending radially inwardly from the casing and having a first engagement surface, an impeller coaxial with the rotational axis and comprising the impeller shell, a turbine-piston coaxial with and axially moveable along the rotational axis and hydro-dynamically drivable by the impeller, and a restricting washer. The turbine-piston comprises a turbine-piston shell including a turbine-piston flange having a second engagement surface movable axially toward and away from the first engagement surface of the piston engagement member to position the hydrokinetic torque coupling device respectively into and out of a lockup mode, in which the turbine-piston is mechanically locked with the casing so as to be non-rotatable relative to the piston engagement portion of the casing. The turbine-piston shell partitions an interior volume of the hydrokinetic torque coupling device into a torus chamber and a damper chamber. The restricting washer is disposed between the impeller shell and the turbine-piston shell for restricting hydraulic fluid flow into and from the torus chamber for increasing a hydraulic fluid pressure in the torus chamber and pushing the turbine-piston shell toward the first engagement surface of the reaction plate.

According to a second aspect of the invention, a method is provided for assembling a hydrokinetic torque coupling device for coupling a driving shaft and a driven shaft together. The method includes the step of providing a casing shell and an impeller shell collectively defining a casing, providing a piston engagement member including an annular reaction plate having a first engagement surface, providing an impeller comprising the impeller shell and a turbine-piston comprising a turbine-piston shell including a turbine-piston flange having a second engagement surface, providing a restricting washer, operatively connecting the impeller with the turbine-piston and mounting the restricting washer between the impeller shell and the turbine-piston shell for restricting a hydraulic fluid flow into and from a torus chamber collectively defined between the impeller shell and the turbine-piston shell, and non-rotatably coupling the piston engagement member to the casing.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 10:
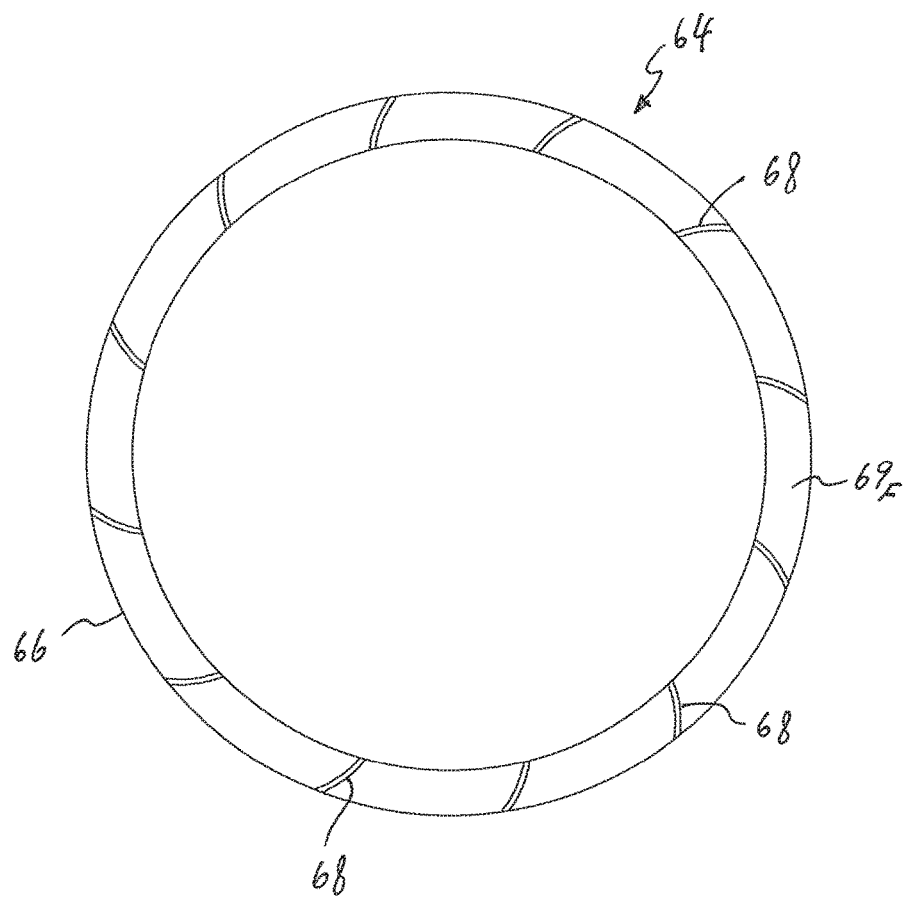
Figure 11:
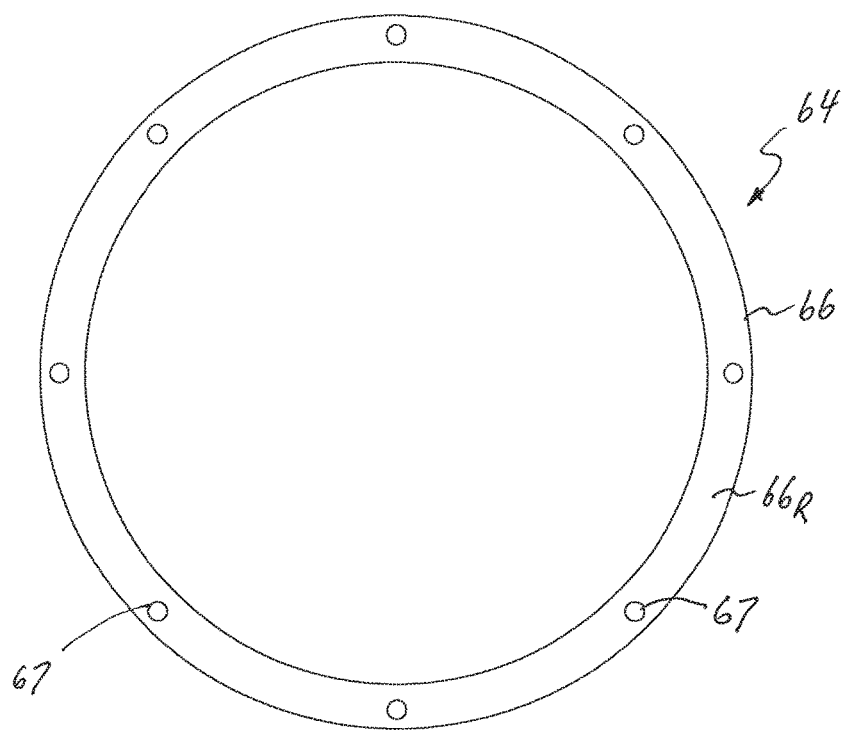

FIG. 10 a front view of the restricting washer of the torque coupling device according to the exemplary embodiment of the present invention; and FIG. 11 is a rear view of the restricting washer of the torque coupling device according to the exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

Figure 1:
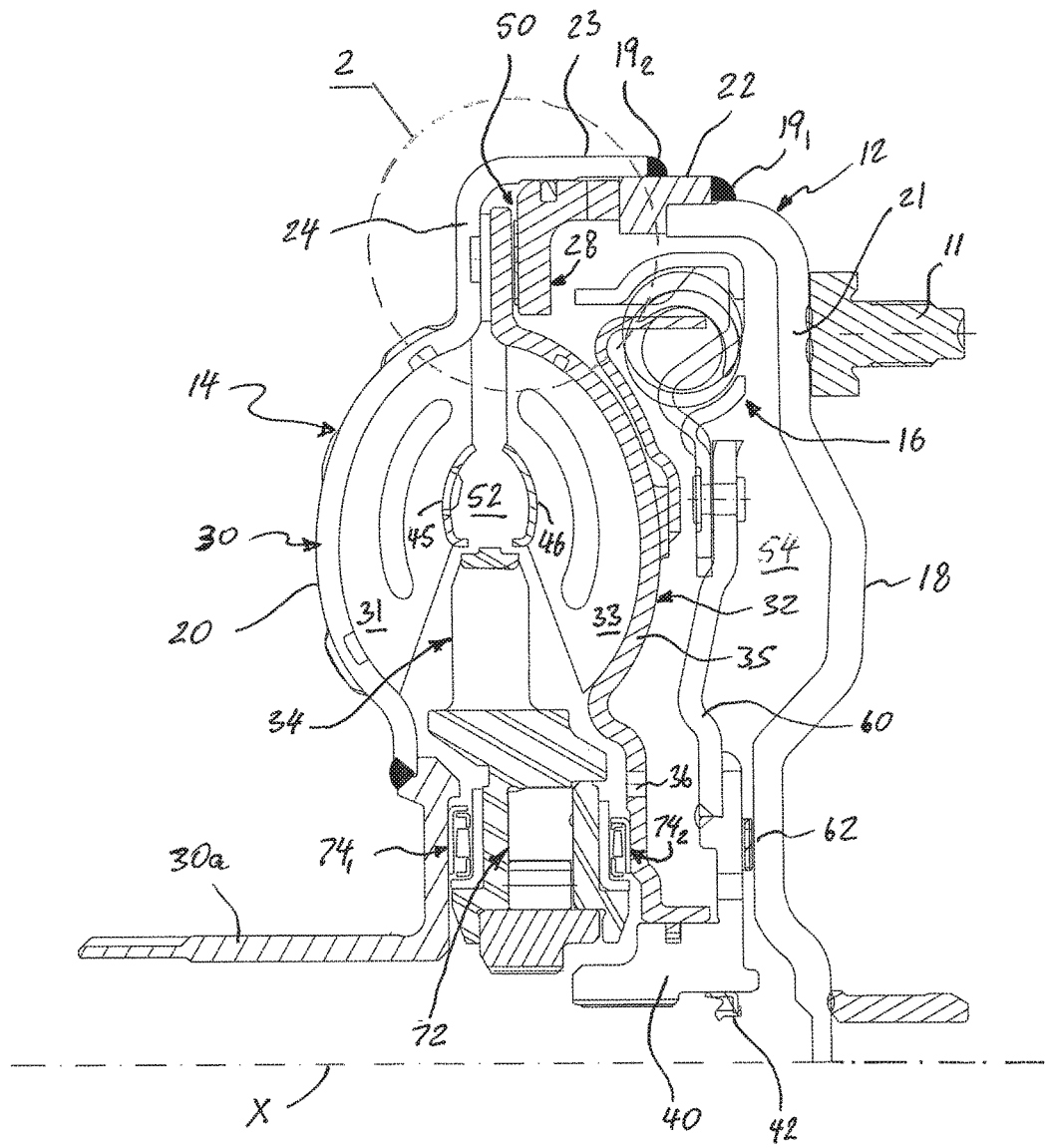
FIG. 1 is a fragmented half-view in axial section of a hydrokinetic torque coupling device in accordance with a exemplary embodiment of the present invention.

An exemplary embodiment of a hydrokinetic torque coupling device is generally represented in FIG. 1 of the accompanying drawings by reference numeral 10. The hydrokinetic torque coupling device 10 is operable to hydrodynamically couple a driving shaft and a driven shaft of a motor vehicle, such as of an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14, and a torsional vibration damper (also referred to as a damper assembly) 16 are all rotatable about a rotational axis X. The drawings discussed herein show half-views, that is, the portion or fragment of the hydrokinetic torque coupling device 10 above (as illustrated) rotational axis X. Generally, the device 10 is symmetrical about the rotational axis X. Herein, the axial and radial orientations are considered with respect to the rotational axis X of the hydrokinetic torque coupling device 10. The relative terms such as "axially," "radially," and "circumferentially" are with respect to orientations parallel to, perpendicular to, and around the rotational axis X, respectively. The relative terms such as "radially inwardly" and "radially outwardly" and derivatives thereof are with respect to orientations toward or away from the rotational axis X, respectively.

The sealed casing 12 according to the exemplary embodiment as illustrated in FIG. 1 includes a first shell (or casing shell) 18, a second shell (or impeller shell) 20 and an annular intermediate casing component 22. Both the second shell 20 and the intermediate casing component 22 are disposed coaxially with and axially opposite to the first shell 18. The first and second shells 18 and 20 are non-movably (i.e., fixedly) interconnected by the intermediate casing component 22 and sealed together about their outer peripheries, such as by welds $19_1$ and $19_2$, as shown in FIG. 1. The casing shell $18_1$ is non-movably (i.e., fixedly) interconnected to the driving shaft, more typically a flywheel (not shown) that is non-rotatably fixed to the driving shaft, so that the casing 12 rotates at the same speed that the engine operates. Specifically, in the illustrated embodiment of FIG. 1 the casing 12 is rotatably driven by the internal combustion engine and is non-rotatably coupled to the flywheel thereof with studs 11, as best shown in FIG. 1.

Figure 3:
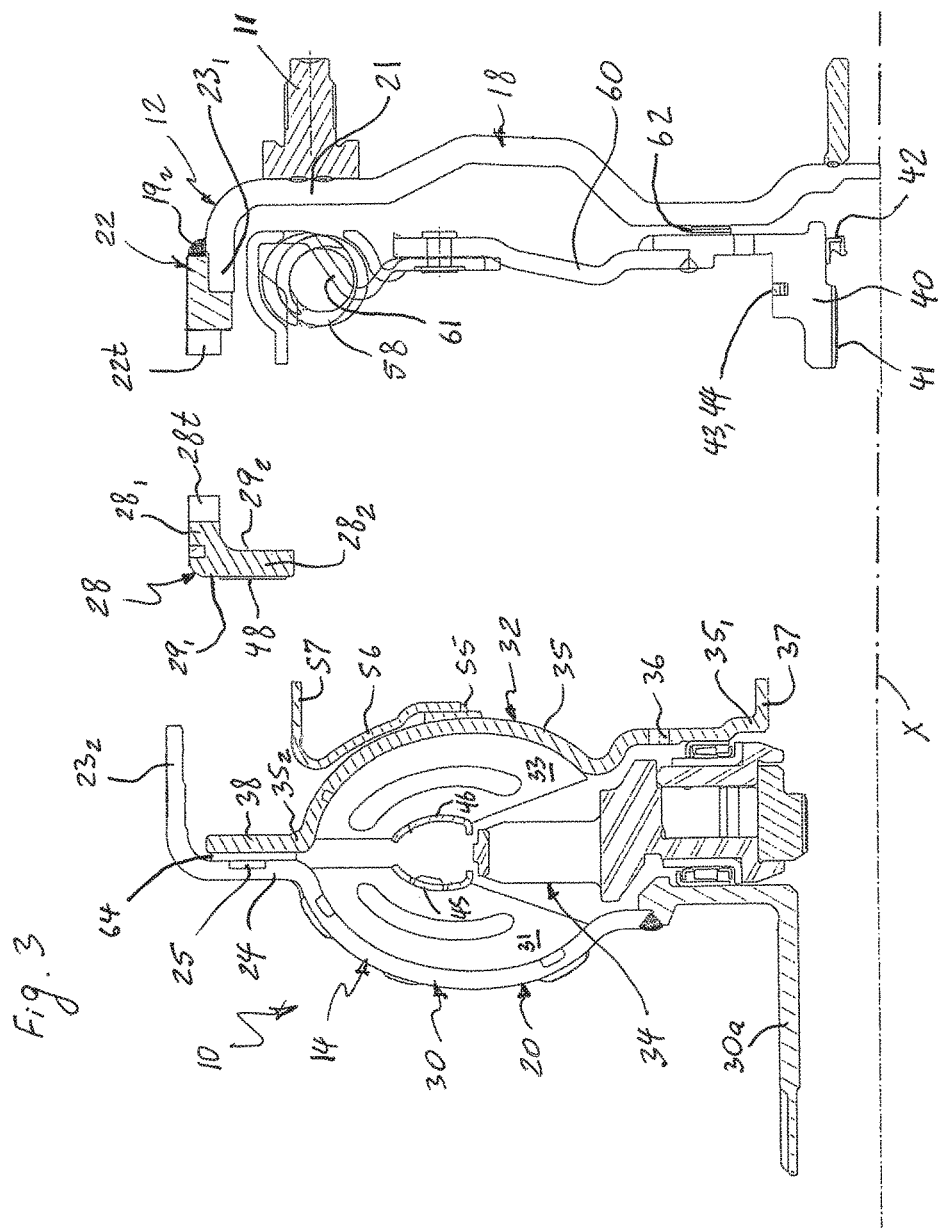
FIG. 3 is an exploded fragmented cross-sectional view of the hydrokinetic torque coupling device of FIG. 1.
Figure 4:
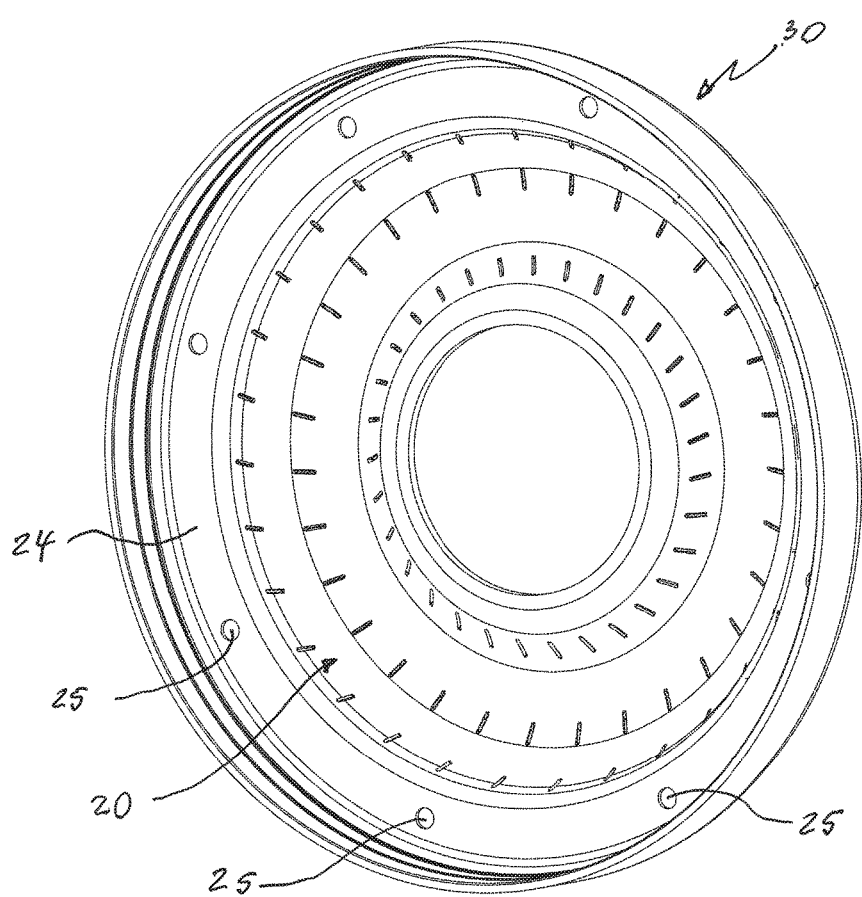
FIG. 4 is a perspective view of an impeller shell of the torque coupling device according to the exemplary embodiment of the present invention.
Figure 5:
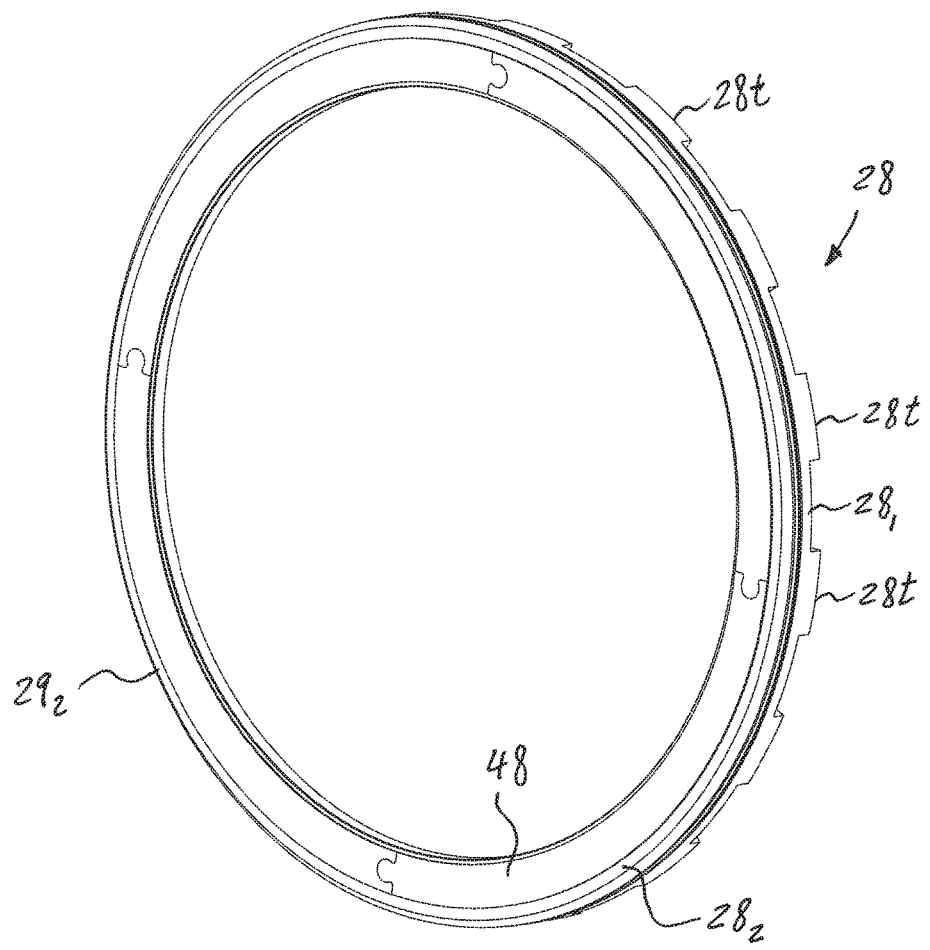
FIG. 5 is a front perspective view of a piston engagement member of the torque coupling device according to the exemplary embodiment of the present invention.
Figure 6:
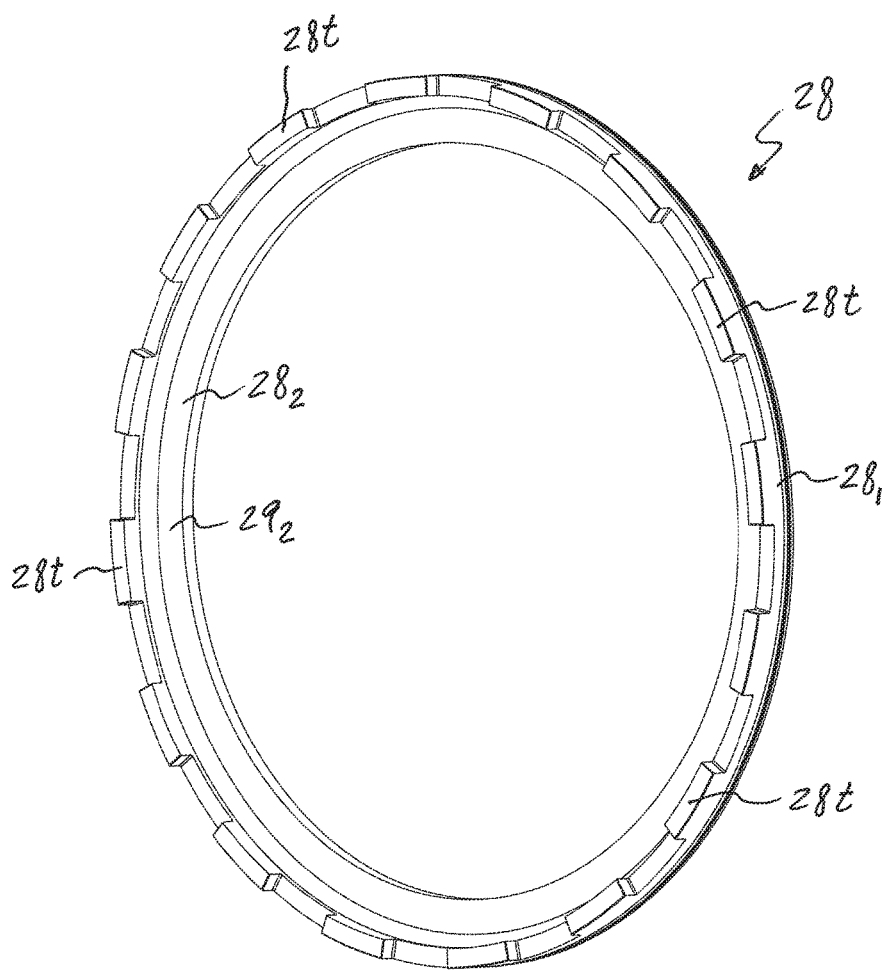
FIG. 6 is a rear perspective view of the piston engagement member of the torque coupling device according to the exemplary embodiment of the present invention.

The first shell 18 includes a first sidewall portion 21 extending substantially radially relative to the direction from the rotational axis X (i.e., in a plane that is generally transverse to the rotational axis X) and a cylindrical first outer wall portion $23_1$, as best shown in FIG. 3, extending substantially axially away from the first sidewall portion 21 toward the second shell 20. Similarly, the second shell 20 includes a second sidewall portion 24 extending substantially radially relative to the direction from the rotational axis X and a cylindrical second outer wall portion $23_2$ extending substantially axially away from the second sidewall portion 24 toward the first shell 18, as best shown in FIG. 3. The second sidewall portion 24 of the second shell 20 is formed with one or more generally cylindrical holes 25 circumferentially equiangularly spaced from one another. Each of the first and second shells 18 and 20 may be made, for example, integrally by press-forming a one-piece metal sheet. The first and second outer wall portions $23_1$ and $23_2$ and the intermediate casing component 22 collectively establish an annular outer wall 23 substantially parallel with the rotation axis X. The welds $19_1$ and $19_2$ fixedly secure the outer wall portions $23_1$ and $23_2$ and the intermediate casing component 22 together. In other words, the intermediate casing component 22 is welded at opposite ends to and interconnects the first and second outer wall portions $23_1$ and $23_2$ together.

Figure 2:
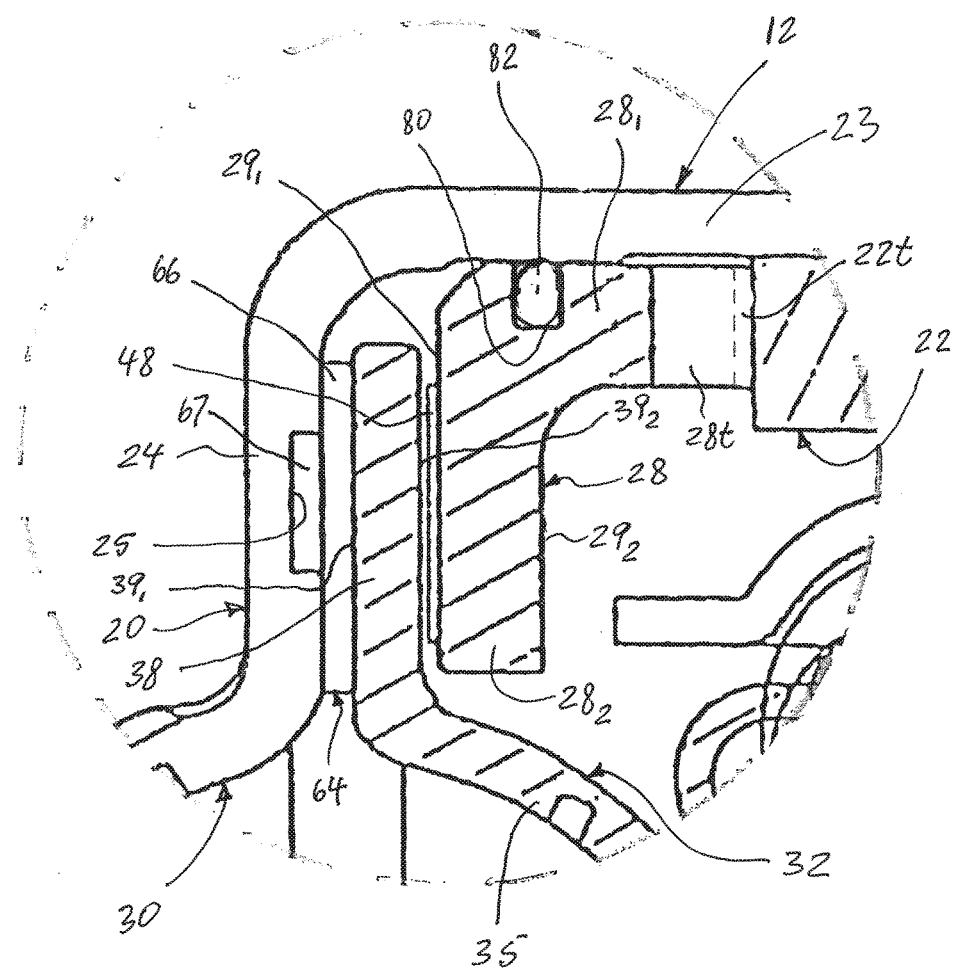
FIG. 2 is an enlarged view of a fragment of the hydrokinetic torque coupling device shown in the circle "2" of FIG. 1.

The hydrokinetic torque coupling device 10 further comprises an annular piston engagement member 28 having an L-shaped cross-section, as best shown in FIGS. 2 and 3. The piston engagement member 28 includes an axially extending tubular (or cylindrical) support portion $28_1$ and an annular reaction plate $28_2$ formed integrally with and extending substantially radially inwardly from the tubular support portion $28_1$. Specifically, the support portion $28_1$ and the reaction plate $28_2$ of the piston engagement member 28 are preferably integrally formed with one another, e.g., made of a single or unitary piece, but alternatively may be separate pieces connected together. The reaction plate $28_2$ of the piston engagement member 28 includes a first engagement surface $29_1$ and a second surface $29_2$ axially opposite to the first engagement surface $29_1$. The first engagement surface $29_1$ is substantially annular and planar, i.e., flat.

In accordance with the exemplary embodiment, the first engagement surface $29_1$ is provided with a friction ring (or friction lining) 48, best shown in FIGS. 2 and 3. The friction ring 48 is made of a friction material for improved frictional performance. The friction ring 48 may be secured to the first engagement surface $29_1$, for example, by adhesive bonding and/or with fasteners. Alternatively, a friction ring (or friction lining) may be secured to the first engagement surface $29_1$. According to still another embodiment, a first friction ring or liner is secured to the first engagement surface $29_1$ of the piston engagement member 28 and a second friction ring or liner is secured to the second engagement surface $39_2$. It is within the scope of the invention to omit one or both of the friction rings.

The piston engagement member 28 is mounted to the casing 12 so as to non-rotatably engage the intermediate casing component 22 of the casing 12. Specifically, the intermediate casing component 22 is formed with one or more first teeth 22t axially facing the piston engagement member 28, as best shown in FIGS. 1-3. Similarly, the support portion $28_1$ of the piston engagement member 28 is formed with one or more second teeth 28t axially facing the intermediate casing component 22, which are complementary to and axially face the first teeth 22t of the intermediate casing component 22, as best shown in FIGS. 1-3, 5 and 6.

In an assembled state, as best shown FIG. 1, the second teeth 28t of the piston engagement member 28 intermesh with the first teeth 22t of the casing 12 so that the flange portion $28_1$ of the piston engagement member 28 is non-rotatably mounted to the intermediate casing component 22 of the casing 12. In other words, the piston engagement member 28 is splined with or keyed to the casing 12 so as to be non-rotatable relative to the casing 12. As best shown in FIG. 2, a radially outer surface of the support portion $28_1$ of the piston engagement member 28 includes an annular slot 80 for receiving a sealing member, such as an O-ring 82. The sealing member (e.g., O-ring) 82 creates a seal at the interface of the casing 12 and the piston engagement member 28.

The torque converter 14 includes an impeller (sometimes referred to as the pump or impeller wheel) 30, a turbine-piston (sometimes referred to as the turbine wheel) 32, and a stator (sometimes referred to as the reactor) 34 situated axially between the impeller 30 and the turbine-piston 32. The impeller 30, the turbine-piston 32, and the stator 34 are coaxially aligned with one another relative to the rotational axis X. The impeller 30, the turbine-piston 32, and the stator 34 collectively form a torus. The impeller 30 and the turbine-piston 32 may be fluidly coupled to one another as known in the art.

The second shell 20 of the casing 12 also forms and serves as the impeller shell of the impeller 30. Accordingly, the impeller shell 20 sometimes is referred to as part of the casing 12. The impeller 30 further includes a core ring 45, and a plurality of impeller blades 31 fixedly attached, such as by brazing, to the impeller shell 20 and the core ring 45. The impeller 30, including its shell 20, the core ring 45, and the impeller blades 31, is non-moveably (i.e., fixedly) secured to the casing 12 and hence to the drive shaft (or flywheel) of the engine and rotate at the same speed as the engine output. The impeller 30 also includes an impeller hub 30a fixedly secured, such as by welding, to the impeller shell 20. The impeller hub 30a is arranged for engagement with a hydraulic pump of the transmission.

The torque coupling device 10 further includes an output hub 40 that is rotatable about the rotational axis X. The output hub 40 is operatively coupled to and coaxial with the driven shaft. For example, the output hub 40 may be provided with internal splines 41 for non-rotatably coupling the output hub 40 to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 42, mounted to a radially inner peripheral surface of the output hub 40, creates a seal at the interface of a transmission input shaft and the output hub 40.

The turbine-piston 32 is a consolidation or incorporation of a turbine with a lockup clutch piston of a lockup clutch 50. The turbine component of the turbine-piston 32 includes a turbine-piston shell 35, a core ring 46, and a plurality of turbine blades 33 fixedly attached, such as by brazing, to the turbine-piston shell 35 and the core ring 46. The rotation of the impeller 30 causes transmission fluid in the torus to rotate the turbine blades 33, and hence the turbine-piston shell 35. The impeller shell 20 and the turbine-piston shell 35 collectively define a substantially toroidal inner chamber (or torus chamber) 52 therebetween. Referring to FIG. 1, the torus chamber 52 is to the left side of the turbine-piston shell 35, and a damper chamber 54 is to the other (right) side of the turbine-piston shell 35.

Extending axially at a radially inner peripheral end $35_1$ of the turbine-piston shell 35 is a substantially cylindrical inner flange 37 that is proximate and coaxial to the rotational axis X, as best shown in FIG. 3. The substantially cylindrical inner flange 37 of the turbine-piston 32 is rotatable relative to the output hub 40. The sealing member (e.g., O-ring) 44 creates a seal at the interface of the substantially cylindrical inner flange 37 and the output hub 40. As discussed in further detail below, the turbine-piston 32 is axially slidingly movably relative to the output hub 40 along this interface. Moreover, the turbine-piston 32 is rotatable relative to the output hub 40 around the rotational axis X.

The piston component of the turbine-piston 32 includes a substantially annular, planar (i.e., flat) turbine-piston flange (or turbine-piston wall) 38 formed integrally with the turbine-piston shell 35. The turbine-piston flange 38 is distal to the rotational axis X relative to the above-discussed inner (or proximal) flange 37. The turbine-piston flange 38 is a radial extension of the turbine-piston shell 35 and, as illustrated in FIG. 3, is situated radially outside of the turbine blades 33. The turbine-piston flange 38 and the turbine-piston shell 35 are illustrated integral with one another, e.g., made of a single or unitary component, but may be separate pieces or components connected together. The turbine-piston flange 38 extends from a radially outer peripheral end $35_2$ of the turbine-piston shell 35 radially outward to terminate at an end in spaced relationship to the annular outer wall 23 of the casing 12. As best shown in FIG. 1, the turbine-piston flange 38 is axially interposed between and extends radially outwardly into a gap between the second sidewall portion 24 of the casing 12 and the first engagement surface $29_1$ of the piston engagement member 28.

Returning to FIG. 2, the turbine-piston flange 38 has a first surface $39_1$ facing the second sidewall portion 24 and an opposite second engagement surface $39_2$ facing the piston engagement member 28. The first and second engagement surfaces $29_1$ and $39_2$ are parallel to and face one another, and extend radially at a 90° angle relative to the rotational axis X. The second engagement surface $39_2$ is movable axially towards and away from the first engagement surface $29_1$ to position the coupling device 10 into and out of a lockup mode, respectively. Alternatively, the first and second engagement surfaces $29_1$ and $39_2$ may extend radially at an oblique angle, i.e., other than 90° relative to the rotational axis X.

The stator 34 is positioned between the impeller 30 and turbine-piston 32 to redirect fluid from the turbine-piston 32 back to the impeller 30 in an efficient manner. The stator 34 is typically mounted on a one-way clutch 72 to prevent the stator 34 from counter-rotation. A first thrust bearing $74_1$ is interposed between the stator 34 and the impeller shell 20 or the impeller hub 30a of the casing 12, while a second thrust bearing $74_2$ is interposed between the stator 34 and the turbine-piston shell 35.

In the lockup mode, the first and second engagement surfaces $29_1$ and $39_2$ (optionally including the friction ring(s) 48 secured thereto) are pressed together such that the turbine-piston flange 38 is frictionally non-rotatably coupled to the reaction plate $28_2$ of the piston engagement member 28, thereby mechanically locking the turbine-piston 32 to the casing 12 in the lockup mode so that the turbine-piston 32 and casing 12 are non-rotatable relative to one another. When not in the lockup mode, the first and second engagement surfaces $29_1$ and $39_2$ are spaced from one another, such that the turbine-piston flange 38 is not frictionally non-rotatably coupled to the piston engagement member 28 and the casing 12. In the non-lockup mode, normal operation of the torque converter 14 selectively hydro-dynamically couples and decouples the impeller 30 to and from the turbine-piston 32.

Figure 9:
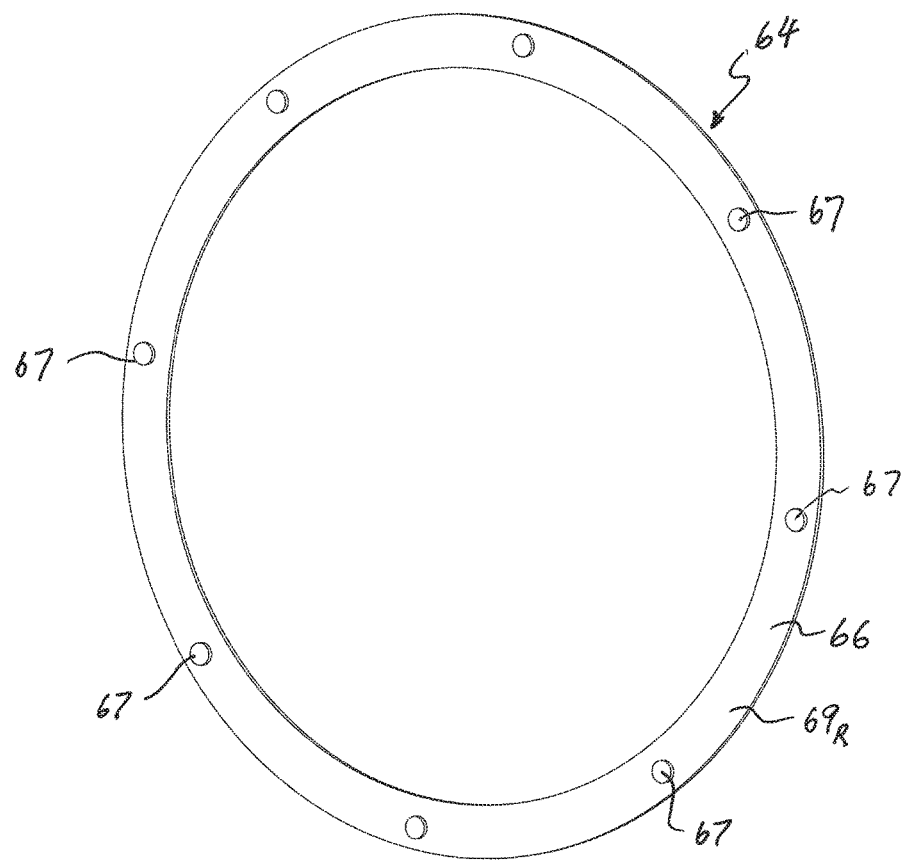
FIG. 9 is a rear perspective view of the restricting washer of the torque coupling device according to the exemplary embodiment of the present invention.

The hydrokinetic torque coupling device 10 further comprises a restricting washer 64 including an annular, substantially planar (i.e., flat) restrictor plate 66 having a generally rectangular cross-section, and one or more pins 67, which axially extend from a rear surface $69_R$ of the annular restrictor plate 66 facing the second sidewall portion 24 of the impeller shell 20, as best shown in FIGS. 9 and 11. The pins 67 of the restricting washer 64 axially extend toward the impeller 30 and are complementary to and engage the holes 25 of the second sidewall portion 24 of the impeller shell 20, as best shown in FIGS. 1-3. In other words, the restricting washer 64 non-rotatably engages the second sidewall portion 24 of the impeller shell 20. The pins 67 extends axially and are press fit or otherwise positioned into the holes 25, such as machined holes, of the impeller shell 20.

The annular restrictor plate 66 extends radially outwardly between the second sidewall portion 24 of the impeller shell 20 and the turbine-piston flange 38 of the turbine-piston shell 35. The restricting washer 64 is positioned radially outward of the impeller blades 31 and the turbine blades 33 at an opening of a fluid passageway connecting the torus chamber 52 to an environment outside the torus chamber 52, i.e., the damper chamber 54.

The restricting washer 64 is configured to restrict flow of hydraulic fluid into and from the torus chamber 52 for increasing a hydraulic fluid pressure in the torus chamber 52 and pushing the turbine-piston 32 toward the first engagement surface $29_1$ of the reaction plate $28_2$ of the piston engagement member 28. In other words, the restricting washer 64 restricts hydraulic flow from the torus chamber 52 to the damper chamber 54, so as to increase the hydraulic fluid pressure in the torus chamber 52 and urge the turbine-piston 32 toward the lockup mode of the lockup clutch 50.

Specifically, in the non-lockup mode, the release hydraulic pressure (due to the pressure differential between the torus and damper chambers 52, 54) is pushing the turbine-piston 32 toward the impeller 30 and a turbine axial load is also directed toward the impeller 30. The restricting washer 64 helps to restrict the hydraulic fluid flow from the torus chamber 52 to a lockup zone between the reaction plate $28_2$ of the piston engagement member 28 and the turbine-piston flange 38 of the turbine-piston shell 35. Leakage flow of the hydraulic fluid is conducted through a leakage hole 36 through the turbine-piston shell 35. In the lockup mode, the applied pressure increases and there is no flow through the torus chamber 52, which helps to increase the pressure in the torus chamber 52 and push the turbine-piston 32 toward the reaction plate $28_2$ of the piston engagement member 28 for frictional engagement in the lockup mode.

The restricting washer 64 is made of an appropriate low friction material, preferably a low-friction plastic material. According to the exemplary embodiment of the present invention, the restricting washer 64 is made of polyamide-imide (PAI) (trademarked as Torlon), organic thermoplastic polymer polyetheretherketone (PEEK) or any other plastic material having a low friction coefficient.

Figure 8:
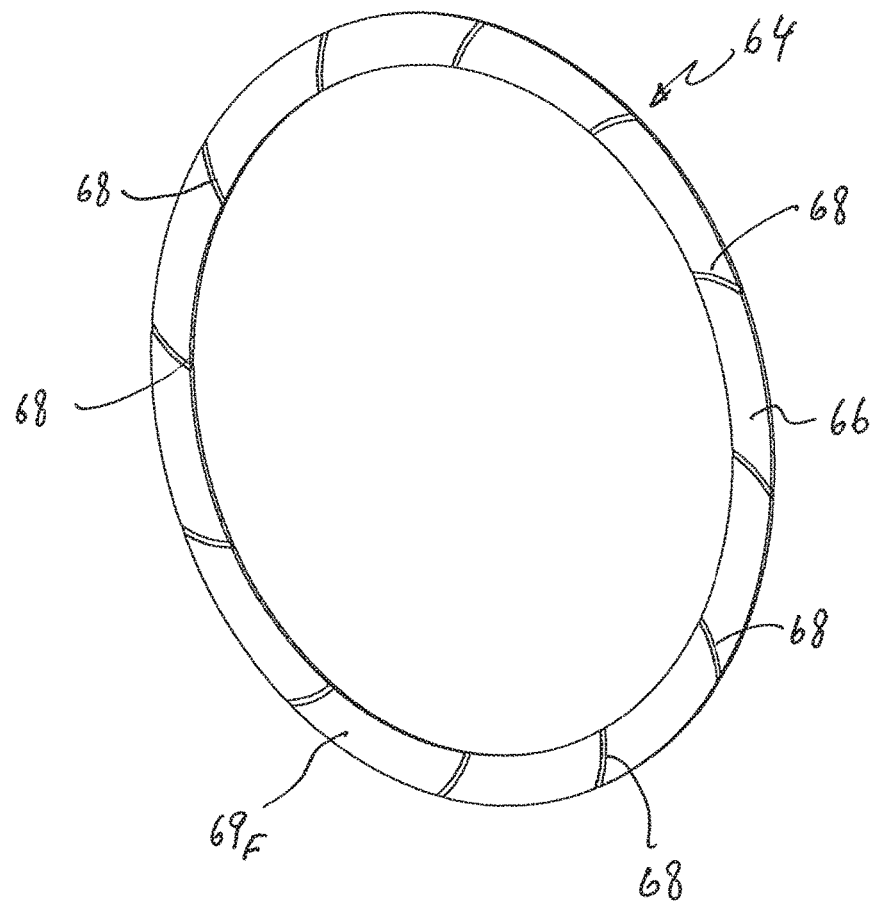
FIG. 8 is a front perspective view of a restricting washer of the torque coupling device according to the exemplary embodiment of the present invention.

One or more passages 68 in the form of generally radially extending grooves (or channels) are formed on a front surface $69_F$ of the restrictor plate 66 facing the turbine-piston flange 38 of the turbine-piston shell 35. The grooves 68 are preferably arcuate and equidistantly spaced from one another about the circumference of the annular restrictor plate 66 of the restricting washer 64 for restricting the hydraulic fluid flow between the torus chamber 52 and the environment outside the torus chamber 52, as best shown in FIGS. 8 and 10.

The grooves 68 restrict the hydraulic fluid flow from the torus chamber 52 to outside the torus chamber 52, e.g., into the damper chamber 54 in the hydrokinetic torque coupling device 10. In the illustrated exemplary embodiment, the flow restriction occurs at the opening of the passageway connecting the torus chamber 52 to the damper chamber 54. FIG. 1 shows the torque converter 14 in a non-lockup mode, or open position, in which the restrictor plate 66 of the restricting washer 64 is sandwiched between (i.e., engages both) the second sidewall portion 24 of the impeller shell 20 and the turbine-piston flange 38 of the turbine-piston shell 35 to limit further axial displacement of the turbine-piston 32 toward the impeller 30.

In a lockup mode, or closed position, the turbine-piston flange 38 of the turbine-piston shell 35 is axially spaced from the restrictor plate 66 of the restricting washer 64. In this axial displacement position, the distance between the turbine-piston flange 38 of the turbine-piston shell 35 and the restrictor plate 66 provides a passageway of greater area than the collective areas of the grooves 68 of the restricting washer 64. The greater restriction to the grooves 68 increases the pressure drop between the torus chamber 52 and the damper chamber 54. This heightened pressure drop reduces the chances of unintended/premature axial displacement of the turbine-piston 32 into non-lockup mode.

The torsional vibration damper 16 is housed in the casing 12 axially between, on one side, the turbine-piston 32 and the piston engagement member 28, and on the other side the casing shell 18, as best shown in FIG. 1. The torsional vibration damper 16 includes a drive (or input) member 56, a plurality of circumferential elastic damping members 58, and a driven (or output) member 60 elastically and drivenly coupled to the drive member 56 through the circumferential damping members 58. According to the exemplary embodiment of FIG. 1, the elastic damping members 58 are configured as helical (or coil) springs oriented substantially circumferentially about the rotational axis X. Other elastic members may be selected to replace or supplement the springs.

The drive member 56 is fixedly connected to the turbine-piston shell 35 of the turbine-piston 32, such as by weld 55, which may be a continuous weld bead. The output side of the drive member 56 has a plurality of driving tabs 57 (FIG. 3) extending axially away from the turbine-piston 32. The driving tabs 57 of the drive member 56 are circumferentially equidistantly spaced from one another, and engage circumferential ends of the elastic damping members 58. In turn, the driven member 60 has a plurality of driven tabs 61 circumferentially equidistantly spaced from one another, and engage the opposite circumferential ends of the elastic damping members 58 than the driving tabs 57. The driven member 60 of the torsional vibration damper 16 is rotatable relative to the drive member 56 due to elasticity of the elastic damping members 58, which absorb torsional vibration. The driven member 60 establishes an output part of the torsional vibration damper 16.

Additionally, the driving tabs 57 of the drive member 56 are axially movable relative to the driven tabs 61 of the driven member 60. This relative axial movement between the driving tabs 57 and the driven tabs 61 may become necessary during axial movement of the turbine-piston shell 35. As discussed in greater detail below, when the turbine-piston 32 shifts axially due to a lockup event, the driving tabs 57 move axially relative to the driven tabs 61. Thus, the drive member 56 is both axially and circumferentially movable relative to the driven member 60 of the torsional vibration damper 16.

The driven member 60 is non-rotatably connected, e.g., fixed, to the output hub 40. The non-rotatable connection between the driven member 60 and the output hub 40 may be formed by splines or welding. Alternatively, the output hub 40 and driven member 60 may be integral with one another. A thrust bearing 62 is positioned between the output hub 40 and the casing shell 18.

As discussed above, the turbine-piston 32 is axially movable toward and away from the impeller shell 20 between a lockup position and a non-lockup (open) position. Axial movement of the turbine-piston 32 is accomplished by changing the pressure differential across opposite sides of the turbine-piston shell 35. A pressure increase in the damper chamber 54 relative to the torus chamber 52 (or stated differently a pressure decrease in the torus chamber 52 relative to the damper chamber 54) shifts the turbine-piston flange 38 axially in the direction of torque transmission, i.e., towards the output side of the casing 12, that is right to left in FIG. 1, away from the lockup mode. On the other hand, a pressure decrease in the damper chamber 54 relative to the torus chamber 52 (or stated differently a pressure increase in the torus chamber 52 relative to the damper chamber 54) shifts the turbine-piston flange 38 axially against the direction of torque transmission, i.e., towards the input side of the casing 12, that is left to right in FIG. 1, into the lockup mode.

In the lockup mode, the turbine-piston shell 35 is displaced axially away from the impeller 30 until the second engagement surface $39_2$ of the turbine-piston flange 38 abuts against and is non-rotatably frictionally coupled to the frictional ring 48 of the reaction plate $28_2$ of the piston engagement member 28. Due to the restricting washer 64 disposed between the second sidewall portion 24 of the casing 12 and the turbine-piston flange 38 of the turbine-piston 32, an axial load acting to the turbine-piston 32 in the direction toward the reaction plate $28_2$ of the piston engagement member 28 is produced, which helps to engage the lockup clutch 50. Torque is transferred from the engine to the casing 12, then by way of the frictional engagement between the surfaces $29_1$ (or frictional lining 48 thereof) and $39_2$ to the locked-up piston engagement member 28 and turbine-piston 32, then serially to the drive member 56 of the torsional vibration damper 16 and the output hub 40. Thereby, the lockup clutch 50 bypasses the hydrodynamic fluid coupling of the torque converter 14 and mechanically couples the driving and driven shafts. Moreover, the friction ring 48 secured to the first engagement surface $29_1$ of the reaction plate $28_2$ of the piston engagement member 28 may have a plurality of circumferentially spaced grooves (not shown) extending generally radially so as to fluidly connect the torus chamber 52 and the damper chamber 54 with one another in the lockup mode for cooling friction surfaces of the lockup clutch 50 by the working hydraulic fluid and creating a very high pressure difference between the torus and damper chambers 52, 54.

In the non-lockup mode, the turbine-piston 32 is displaced axially towards the impeller 30, axially moving the turbine-piston flange 38 until the frictional ring 48 of the first engagement surface $29_1$ of the reaction plate $28_2$ of the piston engagement member 28 is spaced from and no longer non-rotatably frictionally coupled to the second engagement surface $39_2$ of the turbine-piston flange 38. Thus, torque transferred from the engine to the casing 12 does not bypass the torque converter 14 through the lockup clutch 50. The torque is transferred serially from the casing 12, including the impeller shell 20, through the hydrodynamic coupling of the torque converter 14, to the drive member 56 of the torsional vibration damper 16, and to the output hub 40. Notably, in the non-lockup position a restricted serpentine passage is established between the second sidewall portion 24 and the turbine-piston flange 38 through the grooves 68 in the restricting washer 64, and between the turbine-piston flange 38 and the piston engagement member 28, allowing the hydraulic fluid to flow between the torus chamber 52 and the damper chamber 54 through the restricted serpentine passage.

Torque is transmitted through the torsional vibration damper 16 to the output hub 40, which is connected to the driven shaft, for example by the splines 41. As the turbine-piston 32 moves axially into the lockup position as described above, the driving tabs 57 of the drive member 56 are axially displaced relative to the driven member 60. The elastic damping members 58 and the driven member 60 of the torsional vibration damper 16 remain fixed axially on the output hub 40, while the turbine-piston 32 with the drive member 56 is axially moveable. The drive member 56 is axially displaced by pressure difference in the torus chamber 52 and the damper chamber 54 into and out of lockup mode.

In operation, the lockup clutch 50 is generally activated after the hydraulic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring (e.g, washer spring), may be included in the hydrokinetic torque coupling device 10 to urge the turbine-piston 32 into or out of lockup mode.

The turbine-piston 32 forms both the shell component of the turbine and the piston component of the lockup clutch 50, as described above. By consolidating two components that are normally separate from one another into a single component, space is saved in the hydrokinetic torque coupling device 10. This space-saving structure provides several design advantages. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment.

An exemplary method for assembling the hydrokinetic torque coupling device 10 according to the second embodiment of FIGS. 1-10 will now be explained. While the method for assembling the hydrokinetic torque coupling device 10 may be practiced by sequentially performing the steps as set forth below, it should be understood that the method may involve performing the steps in different sequences. It should also be understood that the exemplary method may be practiced in connection with the other embodiments of the present invention. The exemplary methods described herein are not the exclusive methods for assembling the hydrokinetic torque coupling devices described herein.

The impeller 30, the turbine-piston 32, the stator 34, and the torsional vibration damper 16 may each be preassembled. The second sidewall portion 24 of the second shell 20 is formed with one or more generally cylindrical holes 25, such as machined holes, circumferentially equidistantly spaced from one another.

Figure 7:
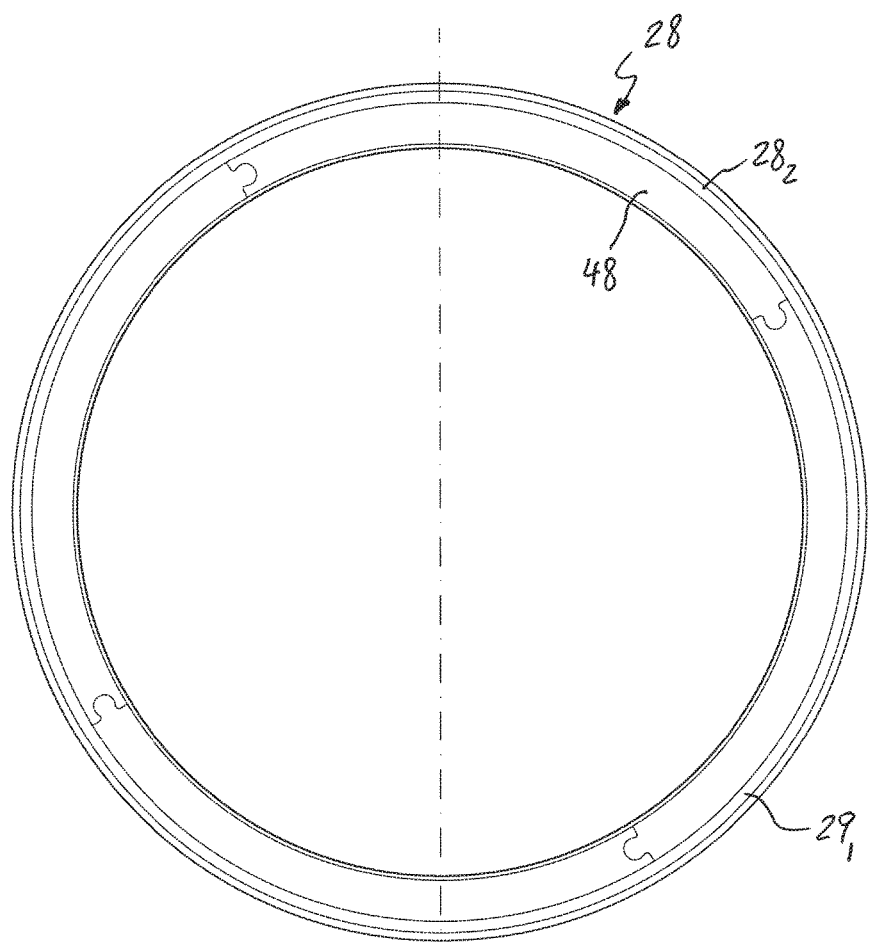
FIG. 7 is a front view of the piston engagement member of the torque coupling device according to the exemplary embodiment of the present invention.

Next, the restricting washer 64 is provided. The restricting washer 64 includes, as disclosed above, the annular, substantially planar (i.e., flat) restrictor plate 66 having a generally rectangular cross-section, and one or more pins 67, which axially extend from a rear surface $69_R$ of the annular restrictor plate 66 and are complementary to the holes 25 of the second sidewall portion 24 of the impeller shell 20. Then, the restricting washer 64 is non-rotatably secured to the impeller shell 20 by press fitting or otherwise positioning the pins 67 of the restricting washer 64 into the holes 25 of the impeller shell 20. Also, one or more passages 68 in the form of generally radially extending grooves (or channels) are formed on a front surface $69_F$ of the restrictor plate 66 axially opposite to the rear surface $69_R$ thereof. The grooves 68 are equidistantly spaced from one another about the circumference of the annular restrictor plate 66 of the restricting washer 64 for restricting the hydraulic fluid flow between the torus chamber 52 and the environment outside the torus chamber 52, as best shown in FIGS. 7 and 9. Then, the impeller 30, the stator 34, and the turbine-piston 32 subassemblies are assembled together so that the restrictor plate 66 of the restricting washer 64 extends radially outwardly between the second sidewall portion 24 of the impeller shell 20 and the turbine-piston flange 38 of the turbine-piston shell 35.

Next, the intermediate casing component 22 is welded to the first shell 18 of the casing 12 by the weld $19_1$, as best shown in FIG. 3. Then, the piston engagement member 28 is placed within the second shell 20 on an opposite side of the turbine-piston flange 38 relative to the second sidewall portion 24, i.e., behind the turbine-piston 32. The drive member 56 is welded to the turbine-piston shell 35 at the weld 55. The torsional vibration damper 16, optionally partially pre-assembled, is added so that the drive member 56 engages the coil springs 58 of the torsional vibration damper 16 as described above. The cylindrical inner flange 37 of the turbine-piston 32 is mounted to slidingly engage the output hub 40 through the seal 44. The driven member 60 of the torsional vibration damper 16 is fixedly secured, such as by welding, to the output hub 40.

As the second shell 20 is mounted to the intermediate casing component 22, the piston engagement member 28 is axially slid along an inner peripheral surface of the second outer wall portion $23_2$ so that the piston engagement member 28 non-rotatably engages the casing 12. Specifically, the first teeth 22t of the intermediate casing component 22 intermesh with the second teeth 28t of the piston engagement member 28 to non-rotatably connect the piston engagement member 28 to the intermediate casing component 22. Alternatively, the piston engagement member 28 and the second shell 20 may be assembled together, then the casing shell 18 may be attached to the piston engagement member 28 so that the teeth 22t, 28t intermesh. The first and second shells 18, 20, and the intermediate casing component 22 are non-moveably and sealingly secured to each other, such as by welding at $19_1$ and $19_2$.

Then, the second shell 20 is non-moveably and sealingly secured, such as by welding at $19_2$, to the intermediate casing component 22, as best shown in FIG. 1.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the hydrokinetic torque coupling device comprising:
    a casing rotatable about a rotational axis, the casing comprising a casing shell and an impeller shell disposed axially opposite to casing shell;
    a piston engagement member non-rotatably coupled to the casing and including an annular reaction plate extending radially inwardly from the casing, the reaction plate having a first engagement surface;
    an impeller coaxial with the rotational axis and comprising the impeller shell;
    a turbine-piston coaxial with and axially moveable along the rotational axis and hydro-dynamically drivable by the impeller, the turbine-piston comprising a turbine-piston shell including a turbine-piston flange having a second engagement surface movable axially toward and away from the first engagement surface of the piston engagement member to position the hydrokinetic torque coupling device respectively into and out of a lockup mode in which the turbine-piston is mechanically locked with the casing so as to be non-rotatable relative to the piston engagement member, the turbine-piston shell partitioning an interior volume of the hydrokinetic torque coupling device into a torus chamber and a damper chamber; and
    a restricting washer disposed between the impeller shell and the turbine-piston shell for restricting hydraulic fluid flow into and from the torus chamber for increasing a hydraulic fluid pressure in the torus chamber and urging the turbine-piston shell toward the first engagement surface of the reaction plate, the restricting washer made of a low-friction material.

2. The hydrokinetic torque coupling device as defined in claim 1, wherein the restricting washer is positioned radially outwardly of impeller blades and turbine blades at an opening of a fluid passageway connecting the torus chamber to the damper chamber.

3. The hydrokinetic torque coupling device as defined in claim 1, wherein the restricting washer comprises an annular restrictor plate extending radially outwardly between the impeller shell and the turbine-piston flange of the turbine-piston shell.

4. The hydrokinetic torque coupling device as defined in claim 3, wherein the restrictor plate of the restricting washer has at least one passage fluidly connecting the torus chamber with the damper chamber.

5. The hydrokinetic torque coupling device as defined in claim 4, wherein the at least one passage is in the form of a generally radially extending groove formed on a front surface of the restrictor plate facing the turbine-piston flange of the turbine-piston shell.

6. The hydrokinetic torque coupling device as defined in claim 1, wherein the restricting washer is non-rotatably secured to the impeller shell.

7. The hydrokinetic torque coupling device as defined in claim 3, wherein the restricting washer has at least one pin axially extending from a rear surface of the annular restrictor plate toward the impeller and engaging complementary holes in impeller shell.

8. The hydrokinetic torque coupling device as defined in claim 1, wherein the turbine-piston flange is situated axially between the reaction plate of the piston engagement member and the impeller shell.

9. The hydrokinetic torque coupling device as defined in claim 1, wherein the turbine-piston is axially movable towards an input side of the hydrokinetic torque coupling device in order to frictionally couple the first and second engagement surfaces and position the hydrokinetic torque coupling device in the lockup mode, and wherein the turbine-piston is axially movable towards an output side of the hydrokinetic torque coupling device so that the first and second engagement surfaces are not frictionally coupled and the hydrokinetic torque coupling device is not in the lockup mode.

10. The hydrokinetic torque coupling device as defined in claim 1, wherein the casing further comprises an intermediate casing component disposed axially between the casing shell and the impeller shell so as to non-movably interconnect the casing shell and the impeller shell.

11. The hydrokinetic torque coupling device as defined in claim 10, wherein the piston engagement member is formed with one or more teeth axially facing the intermediate casing component, wherein the casing is formed with one or more teeth complementary to the teeth of the piston engagement member, and wherein the teeth of the piston engagement member intermesh with the teeth of the casing so that the piston engagement member is non-rotatably coupled to the casing.

12. The hydrokinetic torque coupling device as defined in claim 10, wherein the piston engagement member non-rotatably engages the intermediate casing component of the casing.

13. The hydrokinetic torque coupling device as defined in claim 12, wherein the piston engagement member is formed with one or more teeth axially facing the intermediate casing component, wherein the intermediate casing component is formed with one or more teeth complementary to and axially facing the teeth of the piston engagement member, and wherein the teeth of the piston engagement member intermesh with the teeth of the intermediate casing component so that the piston engagement member is non-rotatably coupled to the intermediate casing component of the casing.

14. The hydrokinetic torque coupling device as defined in claim 1, further comprising:
an output hub; and
a torsional vibration damper elastically coupling the turbine-piston to the output hub.

15. The hydrokinetic torque coupling device as defined in claim 14, wherein the torsional vibration damper comprises a drive member, a driven member non-rotatably coupled to the output hub, and a set of circumferentially extending elastic damping members elastically coupling the drive member to the driven member.

16. The hydrokinetic torque coupling device as defined in claim 15, wherein the driven member of the torsional vibration damper is non-moveably coupled to the output hub.

17. The hydrokinetic torque coupling device as defined in claim 15, wherein the drive member is non-rotatably attached to the turbine-piston shell and axially movable with the turbine-piston relative to the driven member of the torsional vibration damper.

18. The hydrokinetic torque coupling device as defined in claim 1, wherein the low-friction material of the restricting washer is a plastic material.

19. The hydrokinetic torque coupling device as defined in claim 18, wherein the restricting washer is made of polyamide-imide or polyetheretherketone.

20. A method of assembling a hydrokinetic torque coupling device for coupling a driving shaft and a driven shaft together, comprising:
providing a casing shell and an impeller shell collectively defining a casing;
providing a piston engagement member including an annular reaction plate having a first engagement surface;
providing an impeller comprising the impeller shell and a turbine-piston comprising a turbine-piston shell including a turbine-piston flange having a second engagement surface;
providing a restricting washer made of a low-friction material;
operatively connecting the impeller with the turbine-piston and mounting the restricting washer between the impeller shell and the turbine-piston shell for restricting a hydraulic fluid flow into and from a torus chamber collectively defined between the impeller shell and the turbine-piston shell; and
non-rotatably coupling the piston engagement member to the casing.

* * * * *